(No Model.)  2 Sheets—Sheet 1.
H. H. SPENCER.
Spading Machine.
No. 236,641. Patented Jan. 11, 1881.
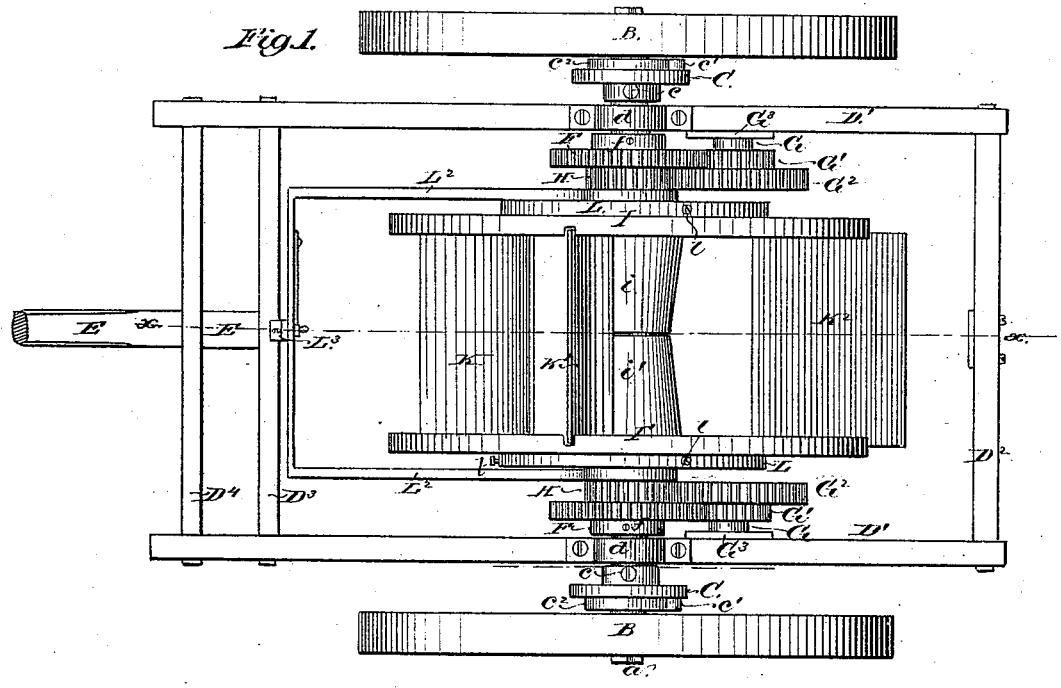
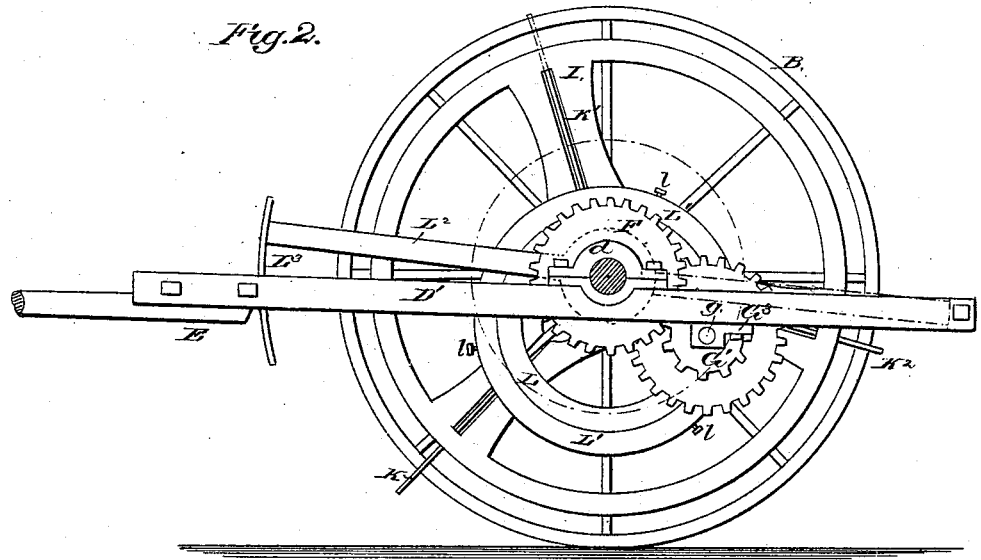
WITNESSES:
INVENTOR:
H. H. Spencer
BY
ATTORNEYS.

(No Model.)  2 Sheets—Sheet 2.

H. H. SPENCER.
Spading Machine.

No. 236,641.   Patented Jan. 11, 1881.

WITNESSES:

INVENTOR:
H. H. Spencer
BY
ATTORNEYS.

UNITED STATES PATENT OFFICE.

HENRY H. SPENCER, OF MOUND CITY, ILLINOIS.

SPADING-MACHINE.

SPECIFICATION forming part of Letters Patent No. 236,641, dated January 11, 1881.

Application filed May 21, 1880. (No model.)

*To all whom it may concern:*

Be it known that I, HENRY H. SPENCER, of Mound City, in the county of Pulaski and State of Illinois, have invented a new and Improved Spading-Machine; and I do hereby declare that the following is a full, clear, and exact description of the same.

My invention relates to rotary spading-machines mounted upon a carriage and operated by the traction of the wheels to cause a series of spades or shovels to have a compound reciprocating movement as the carriage is drawn forward, to shovel up the ground and completely turn it in a manner similar to the operation of spading by hand, and as it is a conceded fact that the soil may be more completely turned by the spading process than by plowshares passing continuously through the ground, it is the object of my invention to so simplify and improve the rotary spading-machine that it may be extensively used for cultivating purposes.

My invention consists, primarily, in imparting to the spades a compound rotary and reciprocating movement which will admit of their being temporarily arrested as the spades enter the ground without checking the movement of the carriage, in order that a sudden strain will not come upon the gearing, which arrest of motion will react off the spades at a suitable moment and cause their rapid withdrawal to free them from the earth raised by them and completely turn it.

My invention further consists in an improved construction of parts to impart a simple rotary and reciprocating movement to the spades; and, finally, in providing a simple means for changing the orbit of motion of the spades around the axle, to either cause the spades to enter the ground to a greater or less depth or to throw them entirely out of range of the surface of the ground, so that they will not come in contact with any ordinary object lying upon the ground, in order that the machine may be readily moved about from place to place without obstruction.

Figure 4:
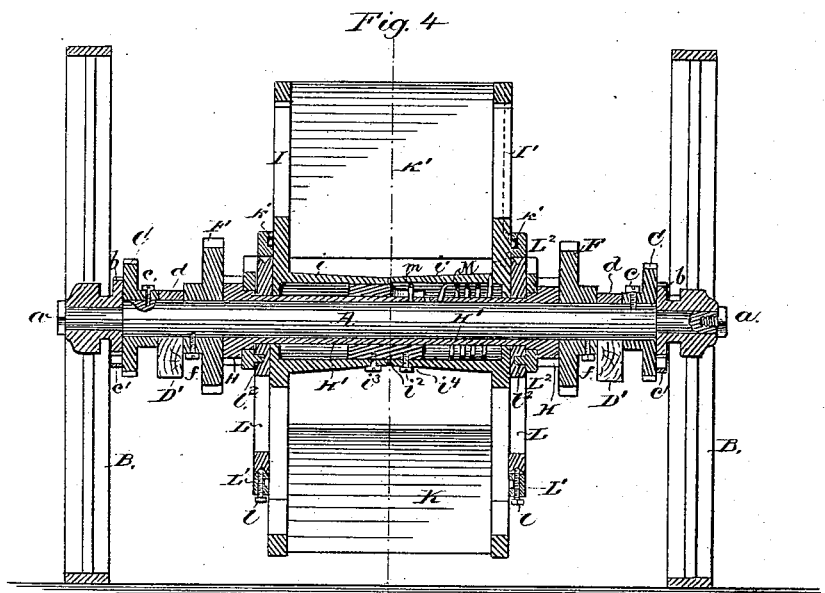
Figure 3:
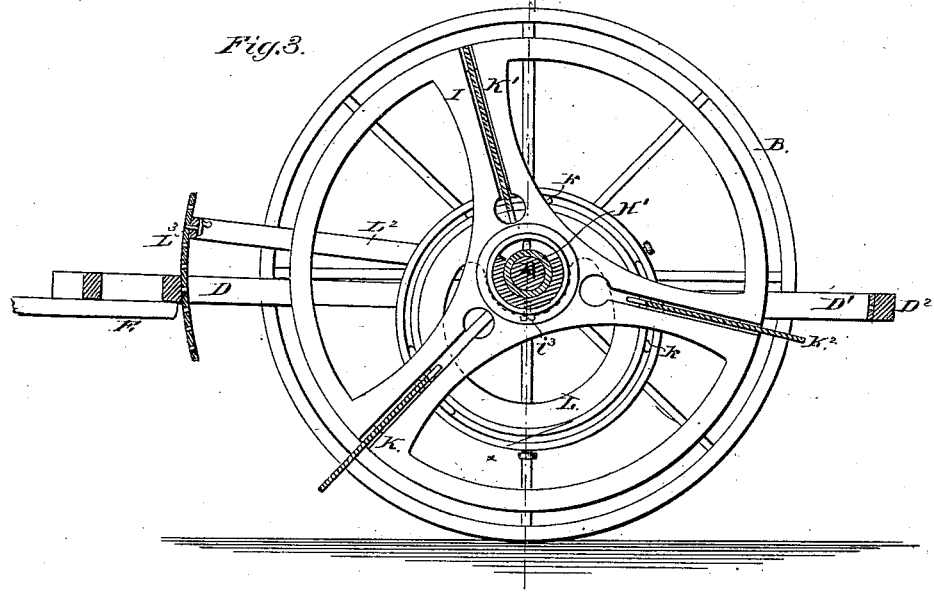

In the accompanying drawings, Figure 1 is a plan view of my improved spading-machine; Fig. 2, a side elevation of the same with the near wheel removed; Fig. 3, a longitudinal section of the same in the line $x\ x$ of Fig. 1; and Fig. 4, a sectional detail through the axle and the sleeves or cylinders which surround it, as hereinafter described.

The main axle A is smoothly turned from end to end, and turns freely in the hubs of supporting-wheels B B, which are secured to the end of the axle by headed screw-bolts $a$, that pass into the end of the axle. The hubs of the wheels are held in place upon the ends of the axle by disks C, held firmly to the axle by set-screw $c$. The disks C are provided with pawls $c'$ and springs $c^2$, which hold the pawls closely against ratchet-teeth $b$ upon the hubs of the wheels B, in such manner that the axle will be caused to revolve by the forward movement of the wheel and remain stationary by the revolution of the wheel in a reverse direction.

The axle A supports a rectangular frame, D, formed of two longitudinal rails, D' D', and of three cross-pieces, $D^2\ D^3\ D^4$, of which the two latter are in front of the axle and give a double support to the inner end of the tongue E. The frame D is held to the axle by straps $d\ d$, which embrace the axle and allow it to turn freely beneath the frame.

The spades are secured to the axle and caused to operate in the following manner: A spur-gear wheel, F, is secured to the axle close to the inner side of the longitudinal frame-piece D' by set-screws $f$. A hub, G, is permanently secured to a small gear-pinion, G', of half the size of wheel F, and a larger wheel, $G^2$, of twice the diameter of pinion G', and both revolve together upon a stud-axle, $g$, secured to a metal plate, $G^3$, bolted to the under side of the frame at such distance behind the axle A that the gear-pinion G' will engage with the spur-gear wheel F. The gear pinion and wheel G' $G^2$ serve as intermediate wheels between the wheel F and a pinion, H, of a diameter equal to that of pinion G', upon the end of a long hollow sleeve, H', that snugly fits the axle and turns freely upon it.

It will be readily seen that by the above system of gearing the sleeve H' will be caused to turn four times upon the axle to each revolution of the supporting-wheels B B.

A second wheel, corresponding with wheel F, may be placed upon the axle close to the inner side of the other rail, and a second set of intermediate gears, similar to those above described, may be employed to gear with a second pinion, similar to H, upon the other end of the sleeve H', which arrangement will insure an even distribution of the strain.

Two metal disks or wheels, I I', with inwardly-projecting hubs $i\ i$, fit upon the sleeve H', and are caused to turn with it in a peculiar manner. The hubs $i\ i'$ abut against each other, and are coupled together by a sleeve, $i^2$, which passes inside the adjoining ends of the hubs $i\ i'$, and are secured to it by set-screws $i^3\ i^4$ passing through them.

The wheels are each provided with three radial slots, arranged to come in pairs directly opposite each other, at equal distances around the hubs. Spade or shovel plates K K' K², with parallel sides, fit snugly in the opposite grooves, and may be moved in the slots to either project beyond the periphery of the wheels to enter the ground a sufficient distance, or may be withdrawn within the outer circle of the wheel for a new stroke and to discharge the earth raised by them.

In order that the shovels may be systematically and effectually pushed forward or withdrawn from the central hub or periphery of the wheels, an eccentric, L, is journaled to the sleeve H' to freely turn thereon, as hereinafter described, to be held in variable fixed positions relatively to the frame of the machine. The periphery of the eccentric L is grooved, and is encircled by a rim, L', held in place upon the eccentric plate by set-screws $l$, that pass through the rim and enter the groove in the periphery of the eccentric. The rim-plate L' is grooved in its face to form a guide-slot, into which are fitted segmental blocks $k$, pivoted to projecting studs $k'$ upon the inner ends of the spade-plates. The blocks $k$ freely travel in the guide-slot of the eccentric rim, and serve to draw the spades toward or thrust them from the center of the axle, as will be readily seen. Should the segmental plates bind against the walls of the groove, the rim-plate L' will yield, so that the movement of the spades is not intercepted. As the rim-plate is held to the eccentric by the bearing or contact of the three screws only, the movement one upon the other is practically frictionless.

A bail or handle, L², is also freely journaled to the sleeve H' between the pinion H and eccentric L, and is provided with studs $l^2$, that take into holes in the outer faces of the eccentric plates and hold them at all times in the same relative position upon the sleeve H' and axle, by which means the eccentric may be both turned together and adjusted upon the sleeve to any required position. The end of the bail L² may be locked into any one of a series of holes or notches in a segment-plate, L³, secured to the inner front cross-bar of the frame, by which means the belly of the eccentric is thrown down to the ground more or less, to adjust the depth of thrust of the spades into the ground. The bail L² may be turned completely over the machine and secured to the rear cross-bar of the frame, in which position the belly of the eccentric will be turned up, so that the thrust of the spades will at all times clear the ground and objects projecting but slightly above its surface. By this means the machine may be readily carried from place to place without allowing the spades to come in contact with the ground or meet with obstructions.

The sleeve H' is connected near its middle with one end of a spiral spring, M, which is coiled around the axle, and is connected at its other end to the hub $i'$. The intermediate sleeve $i^2$, to which the hubs $i\ i'$ are attached, is cut away upon one of its edges for about one-third of its circumference, and a pin, $m$, is screwed into the sleeve H' within the space thus formed in the sleeve. As the hubs and intermediate sleeve $i^2$ are freely journaled upon the sleeve, they will be allowed an independent movement, limited by the length of the recess in the sleeve $i^2$, by means of the pin $m$. As the spring connects the sleeve and hub, the pin will be held against one end of the recess when there is no strain upon the hubs and spades, and as the strain comes upon them the spring will gradually yield until the other end of the recess comes against the pin $m$, and will be held in this place, so that the hubs and sleeve H' will revolve together until the spade has left the ground, when they will be quickly drawn back by the recoil of the spring and by a sudden movement deposit the earth raised by them.

The spring-connection between the axle and the disks above described will allow of the spades to enter the ground with an elastic spring-pressure at a speed less than that of the ordinary movement of the end of the spades, so that no sudden jar or strain will come upon the machinery. The spades will by this means be caused to enter the ground in a manner closely similar to the pressure of the foot in spading with the hand-shovel.

What I claim as new is—

1. A spading-machine supported upon a wheel-carriage, and consisting of a series of spades held in guides and arranged radially around an axle and caused to have a rotary reciprocating motion around and from the axle, in combination with a spring mechanism arranged between the axle and the spades, whereby the said movement will be retarded as the spades shall enter the ground and accelerated as they are withdrawn from the earth, as shown and described.

2. In a spading-machine, the combination of the supporting-wheels, the revolving axle, an independently-revolving sleeve to fit around the axle, guide-disks attached to said sleeve, supporting rotary reciprocating shovels, and the multiple gearing to cause the sleeve and its connections to revolve upon and in the direction with the axle and at an accelerated speed therewith, in the manner and for the purpose substantially as described.

3. In a spading-machine, the combination of the supporting-wheels B B, the driving-axle A, the hollow sleeve H', guide-disks I I', carrying rotary reciprocating spades K, provided with cylindrical hubs that envelop the sleeve H' and are connected therewith by a coiled spring, and a set-screw in the one working in a segmental slot of the other, to limit their movement one upon the other and exert a yielding spring-presssure upon the spades as they enter the ground, substantially as described.

4. The combination, in a spading-machine, of the supporting-wheels B, axle A, sleeve H', multiple gear to connect the axle with the sleeve, guide-disks I I', spades K, eccentric L, with grooved periphery l', secured to peripheral rim L' by set-screws l², and segment-plates K', pivoted to studs K², that slide in slot in the face of the peripheral rim, in the manner and for the purpose substantially as described.

5. In a spading-machine mounted upon a wheeled carriage, the guide-disks I I', supported upon a sleeve or axle and carrying rotary reciprocating spades, in combination with the eccentric L, adjustably connected to the frame of the machine by a bail, L², to regulate the thrust of the spades into the ground or to raise them out of contact therewith altogether, substantially as and for the purpose described.

HENRY H. SPENCER.

Witnesses:
B. L. ULEN,
C. W. MERTZ.